United States Patent
Kleczewski et al.

(10) Patent No.: US 10,655,591 B2
(45) Date of Patent: May 19, 2020

(54) MULTIPLE-KEYED FLYWHEEL AND ENGINE CRANKSHAFT

(71) Applicant: Kohler Co., Kohler, WI (US)

(72) Inventors: Michael Kleczewski, Cleveland, WI (US); James Webster, Elkhart Lake, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 16/138,239

(22) Filed: Sep. 21, 2018

(65) Prior Publication Data

US 2019/0024619 A1 Jan. 24, 2019

Related U.S. Application Data

(63) Continuation of application No. 15/261,508, filed on Sep. 9, 2016, now Pat. No. 10,107,250.

(51) Int. Cl.
| | |
|---|---|
| *F02P 1/00* | (2006.01) |
| *F16C 3/06* | (2006.01) |
| *F16F 15/315* | (2006.01) |
| *F02P 1/02* | (2006.01) |
| *F16C 3/10* | (2006.01) |

(52) U.S. Cl.
CPC .............. *F02P 1/005* (2013.01); *F02P 1/02* (2013.01); *F16C 3/06* (2013.01); *F16C 3/10* (2013.01); *F16F 15/3153* (2013.01)

(58) Field of Classification Search
CPC ...... F02P 1/00; F02P 1/05; F16F 15/31; F16F 15/3115; F16C 3/06
USPC ........... 123/149 D, 197.4, 192.1, 192.2, 618; 290/1 R
See application file for complete search history.

(56) References Cited

U.S. PATENT DOCUMENTS

| | | |
|---|---|---|
| 3,501,973 A | 3/1970 | Casale |
| 4,278,054 A | 7/1981 | Campen |
| 4,285,305 A | 8/1981 | Kaufman et al. |
| 4,993,865 A | 2/1991 | Nagashima |
| 5,181,432 A | 1/1993 | Allen |
| 5,392,753 A | 2/1995 | Burson et al. |
| 6,009,865 A | 1/2000 | Herndon et al. |
| 6,408,716 B1 | 6/2002 | Phelon |

(Continued)

FOREIGN PATENT DOCUMENTS

CN 88102830 A 12/1988

OTHER PUBLICATIONS

Chinese Office Action for Chinese Application No. 201710811107.8 dated Dec. 21, 2018 with English Summary of the Notification.

(Continued)

*Primary Examiner* — John Kwon
*Assistant Examiner* — Johnny H Hoang
(74) *Attorney, Agent, or Firm* — Lempia Summerfield Katz LLC

(57) ABSTRACT

A multiple-keyed crankshaft and flywheel provides for different ignition timing options for an internal combustion engine. The crankshaft of the engine includes multiple keyways set at designated angular displacements of the crankshaft that correspond with keyways on a flywheel for providing different timing options for the engine. The flywheel may be mounted to the crankshaft by aligning one of the keyways of the flywheel to one of the keyways of the crankshaft related to a particular ignition timing selection.

20 Claims, 15 Drawing Sheets

(56) References Cited

U.S. PATENT DOCUMENTS

| | | |
|---|---|---|
| 6,912,929 B2 | 7/2005 | Leith |
| 7,004,134 B2 | 2/2006 | Higuchi |
| 2009/0091137 A1 | 4/2009 | Nishida et al. |
| 2010/0282187 A1* | 11/2010 | Gilpatrick ............... B08B 3/026 123/2 |
| 2018/0073480 A1 | 3/2018 | Kleczewski |

OTHER PUBLICATIONS

Chinese Office Action for Chinese Patent Application No. 201710811107.8, dated Jul. 30, 2019.

* cited by examiner

MULTIPLE-KEYED FLYWHEEL AND ENGINE CRANKSHAFT

CROSS REFERENCE TO RELATED APPLICATION

This application is a continuation under 35 U.S.C. § 120 and 37 C.F.R. § 1.53(b) of U.S. patent application Ser. No. 15/261,508 filed Sep. 9, 2016, the disclosure of which is incorporated herein by reference in its entirety.

TECHNICAL FIELD

This disclosure relates in general to a multiple-keyed flywheel and/or engine crankshaft for an internal combustion engine, or more particularly, multiple keyways in a flywheel and multiple keyways within a crankshaft for optional ignition timing of an internal combustion engine.

BACKGROUND

Small internal combustion engines are used in a variety of devices including, but not limited to: generators, chainsaws, lawn mowers, weed trimmers, all-terrain vehicles, wood splitters, pressure washers, garden tillers, snow blowers, or other devices. A small engine often includes a flywheel disposed on a crankshaft. The flywheel stores rotational energy from the crankshaft or prime mover of an engine. Through momentum and inertia, from one or more of the series of strokes energy, is received from the crankshaft and then delivered to the crankshaft or prime mover in another one or more of the series of strokes. Various engine models may include different relative arrangements of the flywheel and the crankshaft. However, engine designs do not facilitate different relative arrangements in a single apparatus.

BRIEF DESCRIPTION OF THE DRAWINGS

Exemplary embodiments are described herein with reference to the following drawings.

DETAILED DESCRIPTION

Figure 1:
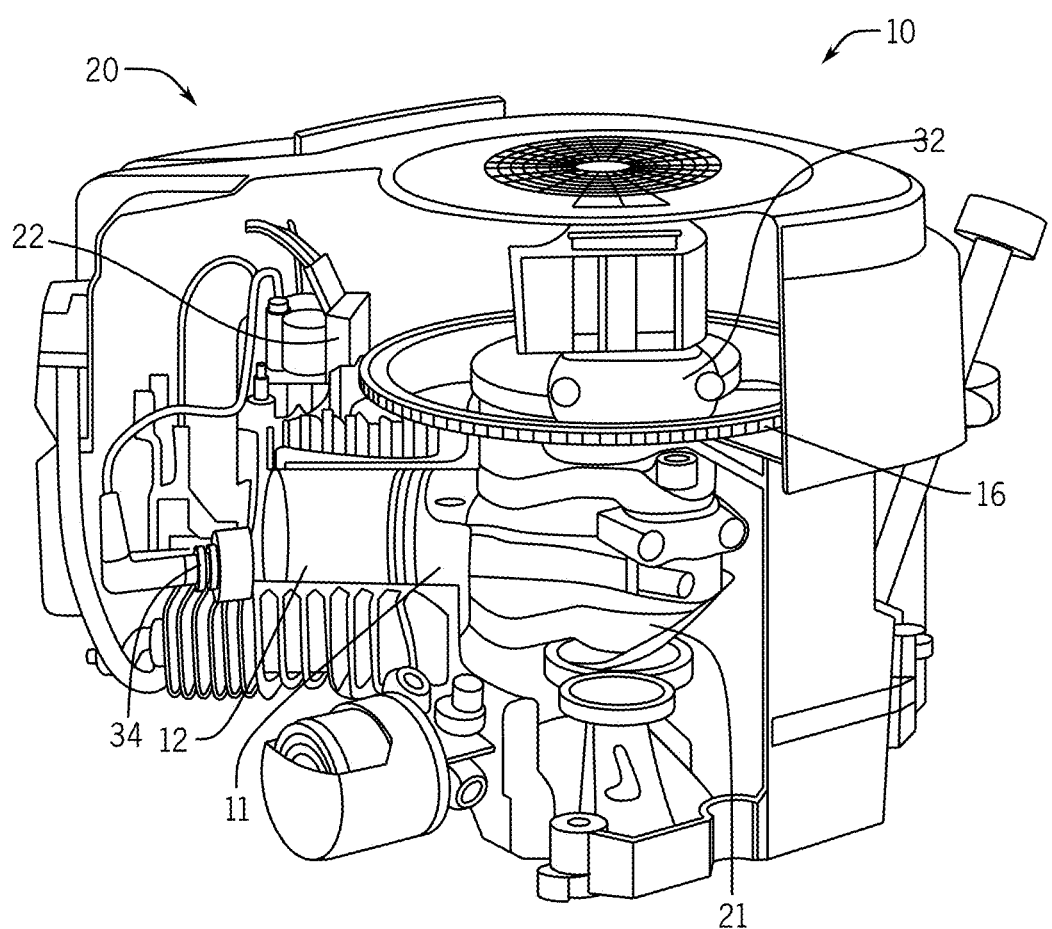
FIG. 1 illustrates an example internal combustion engine.

A small engine often includes a flywheel disposed on a crankshaft. The rotating flywheel includes a magnet that passes an ignition module fixed to the engine to control engine spark within a cylinder during the compression stroke of the piston. Ignition timing varies for each engine and fuel type. Engine ignition timing may be based on the degrees before top dead center ("TDC") of the piston within the cylinder where ignition of the spark plug produces the most power and efficiency.

Ignition timing may vary for each engine and fuel type. The size of the engine cylinder and piston may affect ignition timing within an engine. Likewise, the type of fuel in combination with the engine (i.e. gaseous or liquid) may also affect the ignition timing of an engine. Each fuel type has an ideal burn rate and compression ratio that affects the ignition timing of an engine. In some instances, the same engine may operate with different selected fuel types (i.e. gasoline, natural gas, propane, liquid propane, or others). In this situation, a design of the engine may include different ignition timing for the different fuel types in order to obtain maximum power and efficiency. Each fuel type achieves optimal power output at different timing positions of the piston. Most engines include fixed ignition timing based on the predetermined fuel type, where ignition timing is not selectable. There are, however, techniques for adjusting ignition timing in an engine.

One such technique is disclosed in U.S. Pat. No. 4,278,054 ('054) in which differently sized keys adjusts the timing. The '054 patent utilizes a flywheel with a single keyway and a shaft with a single corresponding keyway. The keyway of the flywheel is larger than that of the keyway in the shaft and the two are not angularly aligned. The keyway of the '054 patent is the element that adjusts the timing of the engine. The keyway is shaped as a "T" including a vertical member and an asymmetrical horizontal member. The vertical member of the key mates with the shaft and the horizontal member mates with the flywheel. The asymmetrical horizontal member of the T shaped keyway changes the angular displacement of the flywheel to the shaft. The '054 patent contemplates different sized keys to adjust the angular orientation from the keyway of the shaft and the keyway of the flywheel. The longer the symmetrical horizontal member of the T-shaped keyway, the greater the angular displacement of the keyways. The offset nature of the keyways is required to result in the rotational change between the flywheel and shaft that renders the change in the ignition timing.

A small engine may also modify ignition timing through use of an ignition system controlled by a processor. In this instance, the system measures the revolutions per minute ("rpm") of the engine, and based upon the rpm of the engine, the processor is programed to fire at a specific angle for a particular speed range, such as 2400 rpm to 3600 rpm. Timing is adjusted by activating a semiconductor switch which initiates transfer of electrical energy within the ignition system that then causes the spark plug to fire. The specific time to activate the switch corresponds with a different timing angle as dictated by the curve to control the firing which can occur at different times depending on the desired requirements.

The following example systems include a multiple-keyed flywheel and crankshaft for adjusting the ignition timing of an internal combustion engine. A crankshaft is a shaft within the engine to which the connecting rods of pistons are connected and cause a rotational force. A flywheel includes a rotational element that increases the engine's momentum and provides stable rotation of the crankshaft. The flywheel includes multiple keyways formed to accept a key and align with one particular keyway of the multiple keyways within a crankshaft to adjust the ignition timing of the engine. A multiple-keyed crankshaft and flywheel provides for different ignition timing options for an internal combustion engine. The crankshaft of the engine includes multiple keyways set at designated angular displacements of the crankshaft that correspond with keyways on a flywheel for providing different timing options for the engine. The flywheel may be mounted to the crankshaft by aligning one of the keyways of the flywheel to one of the keyways of the crankshaft related to a particular ignition timing selection. A keyway is a slot cut in the flywheel and crankshaft for a key to be placed to ensure correct orientation between the flywheel and crankshaft. The key is the piece of shaped material inserted into a keyway to ensure proper orientation of the flywheel and crankshaft.

FIG. 1 illustrates an example internal combustion engine 10. The engine 10 may include: a piston 11, cylinder 12, crankshaft 14, key 15, flywheel 16, air cleaning system 20, ignition module 22 and spark plug 34.

The engine 10 may be any type of engine 10 in which the combustion of a fuel (e.g., gasoline or another liquid fuel) with an oxidizer (e.g., air) in a chamber applies a force to a drive component (e.g., piston, turbine, or another component) of the engine 10. The drive component rotates or otherwise moves to perform work. The engine 10 may power a generator, chainsaw, lawn mower, weed trimmer, all-terrain vehicle, boat engine, go kart, wood splitter, pressure washer, garden tiller, snow blower, or another device. The engine 10 may be a two-stroke engine or a four-stroke engine. The number of cylinders of the engine 10 may vary to include one cylinder or multiple cylinders. The size of the engine 10 may vary depending on the application. For example, the size of the engine or a chain saw may be 1.5 cubic inches to 2.8 cubic inches, the size of the engine for a lawn mower may be 50 cubic inches to 149 cubic inches, and the size of the engine for an all-terrain vehicle may be 200 cubic inches to 748 cubic inches. The size of the engine may be larger or smaller.

Figure 2:
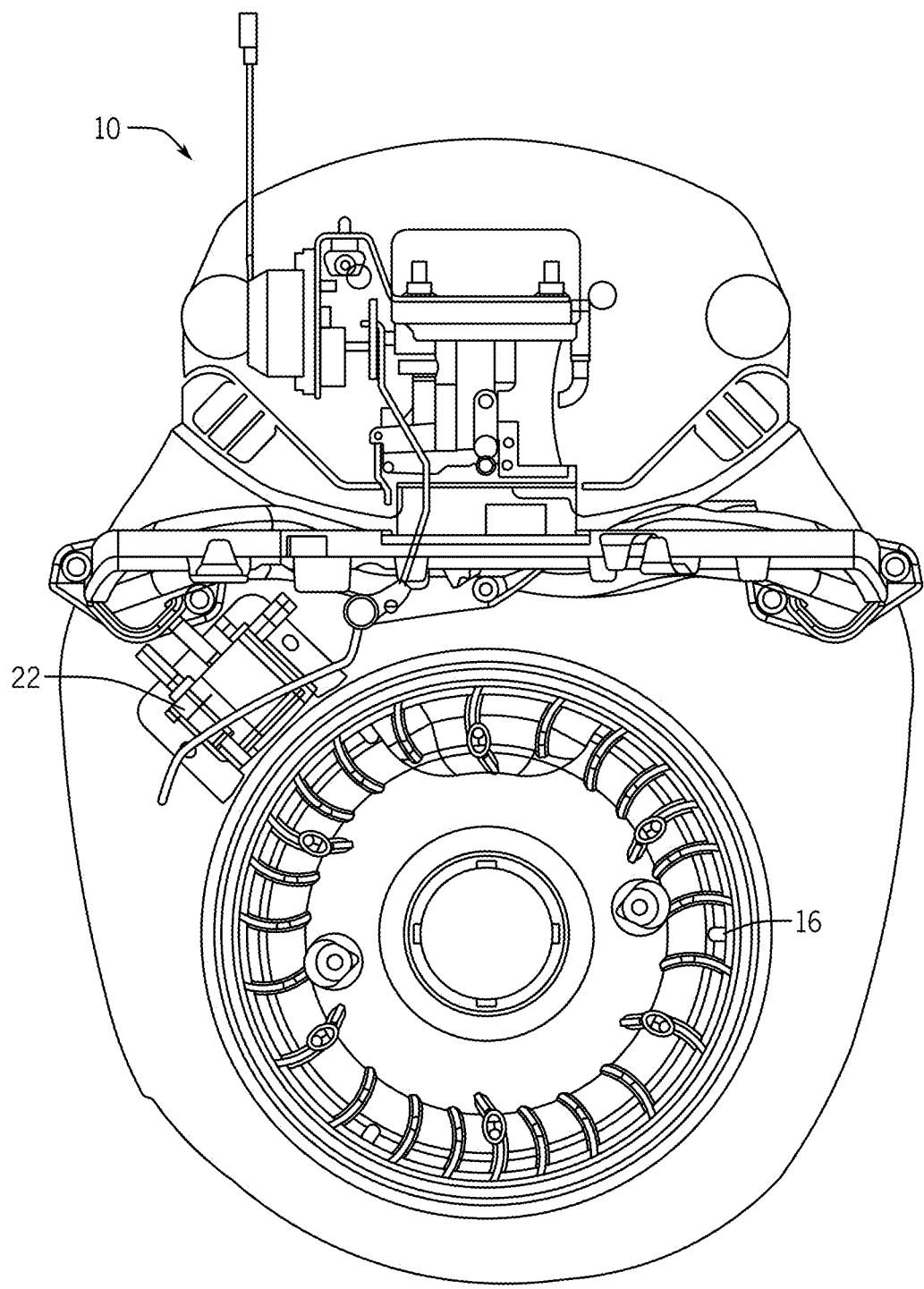
FIG. 2 illustrates an example internal combustion engine showing particular systems of the engine.

FIGS. 1 and 2 illustrate example internal and external components of the engine 10 or coupled with the engine 10. The external components may include a crankshaft 14, flywheel 16, muffler, air cleaning system 20, and a control portion. The phrases "coupled with" or "coupled to" include directly connected to or indirectly connected through one or more intermediate components. Additional, different, or fewer components may be provided.

A fuel tank stores fuel (e.g., gasoline), which may be delivered to a carburetor. The carburetor may provide fuel to the cylinders 12 of the engine 10. At the same time, the air cleaning system delivers clean air from the air cleaning system 20 into the cylinders 12 to facilitate combustion. Combustion within the cylinders 12 is caused by the ignition module 22, which fires the spark plug 34, igniting the fuel air mixture. Timing of the ignition module 22 may be operated by the flywheel 16 as it rotates with the crankshaft 14 and passes a magnet 32 across the ignition module 22. As a result of the combustion within the cylinders 12, the piston 11 drives the crankshaft 14 to produce engine output. Following combustion, the exhaust is directed through a muffler and out of the engine 10.

The power and efficiency of the engine 10 may depend on the ignition timing of the engine 10. Depending on the fuel type (i.e. gasoline, natural gas, propane, or liquid propane) it may be necessary to use different ignition timing settings of the engine 10. Changing the ignition timing may be accomplished by selecting a specific position of the flywheel 16 and magnet 32 when coupled relative to the crankshaft 14.

FIGS. 1 and 2 further depict the ignition module 22. The ignition module 22 controls the firing of the spark plug 34 within the cylinders 12. The ignition module 22 may be mounted on the crankcase in a fixed position located adjacent the flywheel 16. The ignition module 22 may include a charge coil, primary and secondary ignition coil, spark plug 34, high voltage capacitor and a semiconductor switch. The capacitor is used to store the electrical charge generated from the interaction of the magnet 32 and the charge coil. The semiconductor switch, when activated, breaks the electrical contact between the capacitor and a primary coil, transforming low energy at the primary coil to high energy at the secondary coil which then causes spark plug 34 to fire in the combustion chamber. In a multi-cylinder engine, each cylinder may have an ignition module. The ignition module 22 may be an inductive magneto ignition module where energy can be developed by a current charge in the coil primary or a capacitor magneto ignition module where a voltage charge is stored in a high voltage capacitor. In an inductive ignition system as the magnet on the flywheel passes the ignition module, current is developed in the coil primary and then the current path is disrupted with the semiconductor switch, creating a voltage that flows through transformer action from the primary to the secondary coil causes the spark plug to fire. In a capacitive ignition system, a voltage capacitor is charged from a charge coil that is energized by the rotational movement of the magnet on the flywheel 16 passing the ignition module 22. When the semiconductor switch is activated it causes that energy to be transferred to the coil primary and secondary through transformer action. A processor based control may also determine when activate the semiconductor switch to fire the spark plug within a given rotational speed of the engine 10. The processor may receive a signal conveying the rpm of the engine. Once the engine reaches the defined range of rpm, the processor may be programed to fire the spark plug when the crankshaft is at a specific angle.

Figure 3:
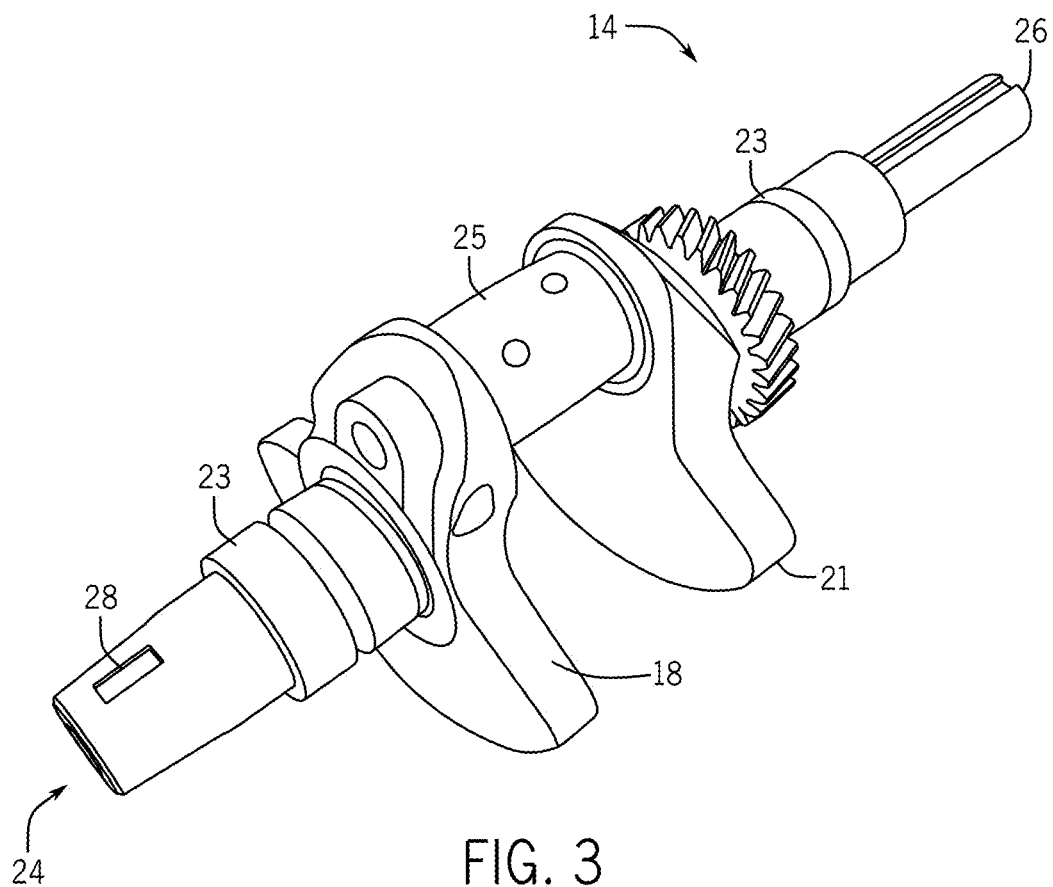
FIG. 3 illustrates of a crankshaft of the engine of FIG. 1 or of FIG. 2.

FIG. 3 depicts a crankshaft 14 and key 15 of the engine 10. At one end of the crankshaft is the power output portion 24 and at the other end is the flywheel mounting portion 26. The crankshaft 14 may also include counterweights 21, main bearings journals 23, connecting rod journals 25, and web 27. The crankshaft is supported within the engine by the main journals 23 near each end of the crankshaft. The main journal 23 may be may be connected to counterweights 21. The counterweights 21 balance the offset weight of the pistons 11 connected to the crankshaft 14. The webs 18 are connected to the counterweights 21 and are attached to the connecting rod journal 25. The connecting rod journal 25 spans the space between the webs and supports the connecting rod and head of the piston 11. The crankshaft 14 depicted is configured for two pistons, however, a crankshaft set up to function with one or multiple pistons is possible or different configurations of the pistons is also possible. The pistons 11 may be aligned in a V-shaped configuration or an inline configuration. Where an engine includes a plurality of pistons the crankshaft 14 may be modified to include a counterweight 21, web 18 and connecting rod journal 25 or each piston 11 of the engine. The power output 24 of the crankshaft 14 may be configured to drive a generator, lawnmower or other device through mechanical power. The flywheel drive portion 26 of the crankshaft 14 may include a tapered portion to facilitate a press fit attachment of the flywheel 16 to the crankshaft 14. The flywheel drive 26 of the crankshaft 14 may also be configured with a flange or other configurations to enable the flywheel 16 to be attached to the crankshaft 14. The flywheel drive portion 26 of the crankshaft 14 as depicted includes a keyway 28. The keyway 28 may be used to align the flywheel 16 on the crankshaft 14 and to also maintain the flywheel in the proper location. The crankshaft 14 and key 15 may be formed from any metal or alloy material. The material may include cast iron, ductal iron, aluminum, chrome steel, or steel.

Figure 4:
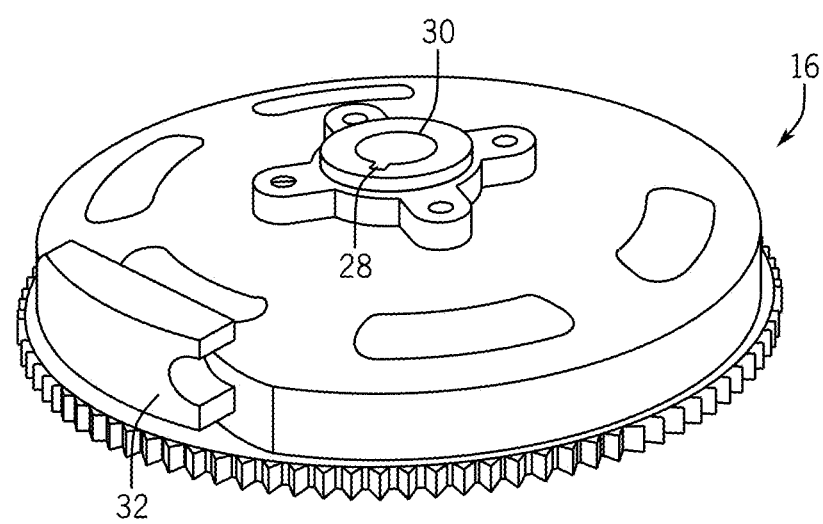
FIG. 4 illustrates an example flywheel of the engine of FIG. 1 or of FIG. 2.

FIG. 4 depicts the flywheel 16 of the engine 10. The flywheel 16 may include a center bore 30 with a keyway 28 that is sized to correspond to attach to the flywheel drive portion 26 of the crankshaft 14. The flywheel 16 may be formed from any metal or alloy material. The material may include cast iron, ductal iron, aluminum, or chrome steel. The bore 30 as depicted in FIG. 4 is configured to press fit onto the crankshaft 14. The flywheel 16 may include a magnet 32 fastened to the edge of the flywheel 16. The magnet 32 may be mounted to the flywheel 16 to energize and activate the ignition module 22. The magnet 32 may be fastened to the flywheel 16 using screws or any other suitable method. The magnet 32 rotating about the axis of the flywheel and crankshaft, passes the ignition module 22, charging the coil or capacitor that when activated through the semiconductor switch, sends a current to the spark plug 34 causing it to fire within the cylinder. Each time the magnet 32 passes the ignition module 22 it passes current to the spark plug 34. Some revolutions of the cylinder and the spark plug energy is wasted (not used) as that cylinder will not be in a combustion stroke cycle. The number of degrees from the cylinder position or TDC in which the magnet passes the ignition module 22 may set the timing for the engine 10. The magnet 32 may be advanced or retarded in an angular displacement from TDC to set the firing of the engine when the crankshaft has not yet rotated past TDC or has rotated slightly past TDC when the piston is in compression. Modifying the timing of the firing of the spark plug may be due to fuel not completely burning at the exact time the spark plug fires. In most instances, the timing of the engine will be based on the angle of the ignition timing before the crankshaft reaches TDC. This is known as advancing the timing of the engine. This is done to account for the fact that the fuel in the cylinder does not all burn the instant the spark plug fires and the combustion gasses take time to expand.

In operation, the crankshaft 14, flywheel 16, and ignition module 22 may each function together to appropriately time the firing of the spark plug 34. Ignition timing of the engine 10 may depend on the angular orientation of the magnet 32 of the flywheel 16 from TDC of the crankshaft 14. The ideal angular orientation of the magnet 32 and flywheel 16 may depend on the fuel type for the engine 10. The same engine 10 may run a variety of different fuels: gasoline, natural gas, propane, or liquid propane for example. Each of these fuels have an ideal timing of the firing of the engine 10 that depends on the burn rate and compression ratio of the fuel. For example, natural gas may have an ideal timing of a first setting of degrees from TDC (e.g., 37 degrees before TDC, a range of 30-40 degrees before TDC, or a range of 20-50 degrees before TDC), whereas propane may have an ideal timing of a second setting of degrees before TDC (e.g., 27 degrees before TDC, a range of 20-30 degrees before RDC, or a range of 10-40 degrees before TDC).

Figure 5:
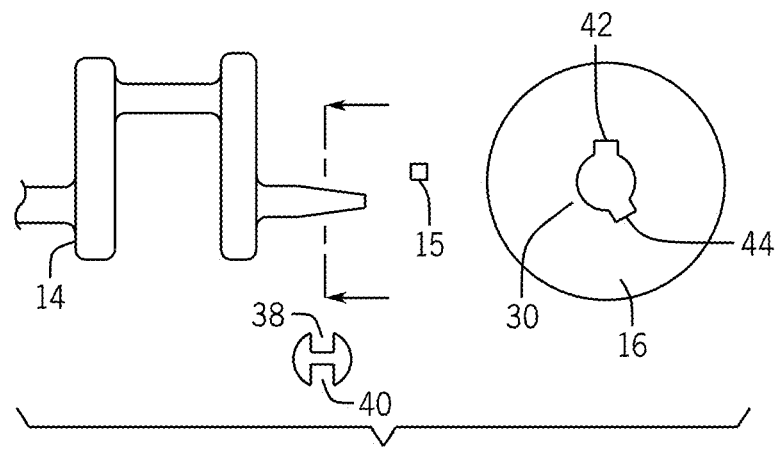
FIG. 5 illustrates a detailed view of an example of a dual-keyed flywheel with varied offset and a crankshaft.

FIG. 5 illustrates a detailed view of the crankshaft 14 and flywheel 16 utilizing a dual-keyed configuration to provide two relative alignments between the crankshaft 14 and the flywheel 16, and accordingly two ignition timing options for the engine 10 using the same flywheel 16 and ignition module 22. In this embodiment, two keyways (first keyway 38, second keyway 40) are formed on the crankshaft 14 and two keyways (first keyway 42, second keyway 44) are formed on the flywheel 16. The keyways of the system may also be described as a first keyway, a second keyway, and a third keyway relating to the flywheel keyways and a fourth and fifth keyway related to the crankshaft keyways. Aligning the first keyway 38 of the crankshaft 14 and the first keyway 42 of the flywheel 16 provides for a first ignition timing position option 17 and aligning the second keyway 44 of the crankshaft 14 and the second keyway 44 of the flywheel 16 provides for a second ignition timing position option 19.

Figure 6:
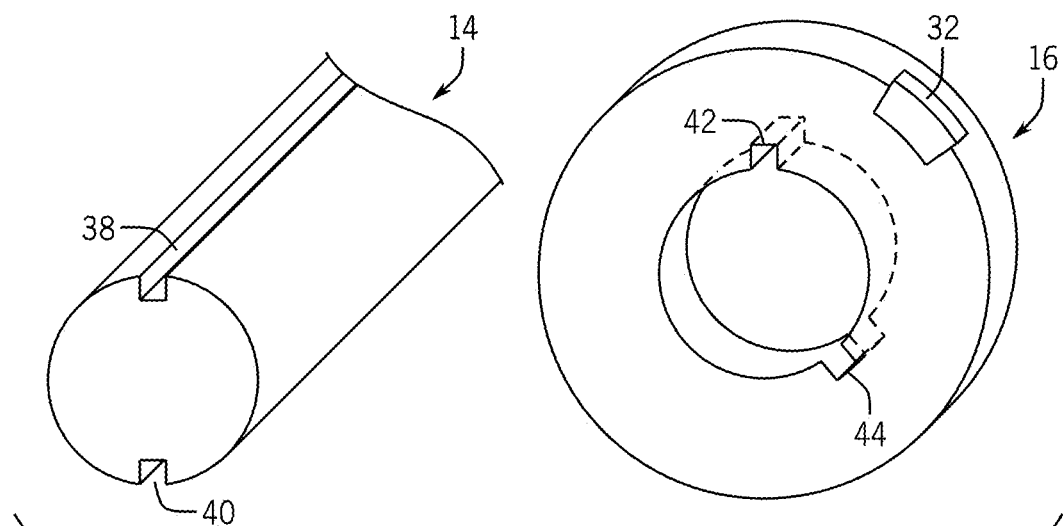
FIG. 6 illustrates a perspective of the flywheel and crankshaft of FIG. 5.

In the dual-keyed configuration as depicted in FIG. 6, the crankshaft 14 includes two keyways. A first keyway 38 is located on top of the crankshaft 14 at TDC, and a second keyway 40 is located at a predetermined angle (e.g., 180 degrees) from TDC on the bottom of the crankshaft 14. The flywheel 16 may include two keyways to correspond with two desired options for ignition timing of the engine. A first keyway 42 may be included within the flywheel 16 and configured to align with the first keyway 38 of crankshaft 14 at TDC, setting a first ignition timing. The magnet 32 of the flywheel 16 may be fixed on the flywheel 16 at an angular orientation for the first of the desired ignition timing 17 for one of the particular fuel types. The magnet 32 may be fixed to the flywheel 16 for the first desired ignition timing 17 of a first setting of degrees before TDC (e.g. 20 degrees before TDC, a range of 18-22 degrees before TDC, or a range of 15-20 degrees before TDC). A second keyway 44 may be spaced apart from the other flywheel keyway 42 in a range of 160 degrees to 180 degrees.

In order to ensure the correct keyways are aligned to relate to the correct ignition timing setup, the corresponding first crankshaft keyway 28 and first flywheel keyway 42 may be sized or shaped differently than the second crankshaft keyway 40 and second flywheel keyway 44. Regarding the size of each key and keyway for a same flywheel and crankshaft ignition timing setting, it is possible where each key and keyway is the same shape, however, the difference between the sizes, it will be apparent where one key does not fit in the incorrect keyways and the keyways are visually different sizes. For example, two keys and keyways of the same flywheel and crankshaft connection may both be square keys and keyways, one large and one small. In this configuration, the large key and keyway would be of a sufficient size that the large key will not fit within the small keyways. Likewise, the small key and keyways may be of a sufficient size such that placing the key in either of the large keyways may result in a fit that is loose, clearly indicating that the alignment is incorrect key. Other differently sized keys are additionally possible. The key may also be different shapes so as to not fit within the incorrect setting. Possible keys and keyways shapes include, but are not limited to: square, flat, woodruff, taper, flat bottom, and feather.

Figure 7:
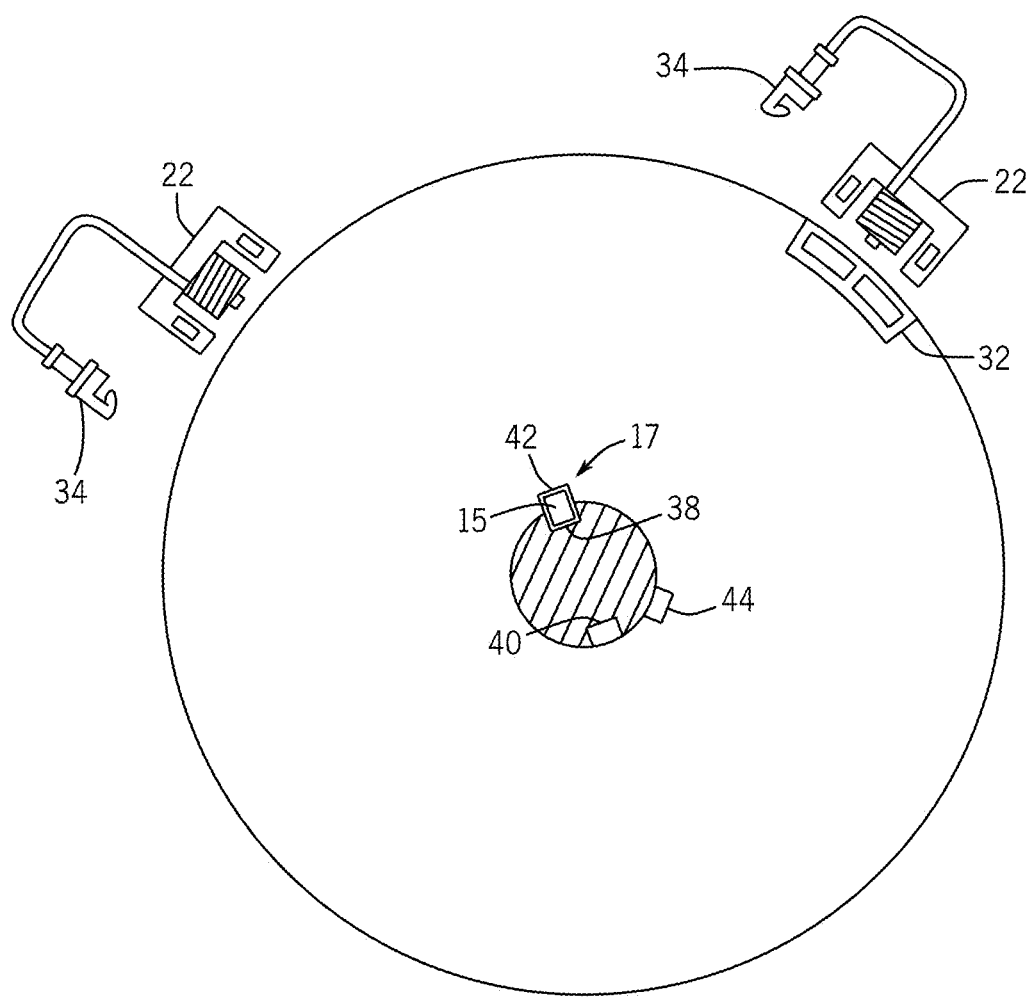
FIG. 7 illustrates a detailed view of an example of a dual-keyed flywheel and a crankshaft with a varied offset of FIG. 5 in a first position.

As depicted in FIG. 7, the first keyway 38 of the crankshaft 14, the first flywheel keyway 42, and key 15 that correspond together may be a different size as compared to the second keyway 40 of the crankshaft 14, the second keyway 44 of the flywheel 16 and key 15. Similarly, the first crankshaft keyway 38 and first flywheel keyway 42 may have a different shape, color, or material then the second crankshaft keyway 40 and second flywheel keyway 44. Further indicia may be placed on the crankshaft 14 or flywheel 16 to facilitate the proper alignment of the keyways to identify the desired ignition timing selection.

Figure 8:
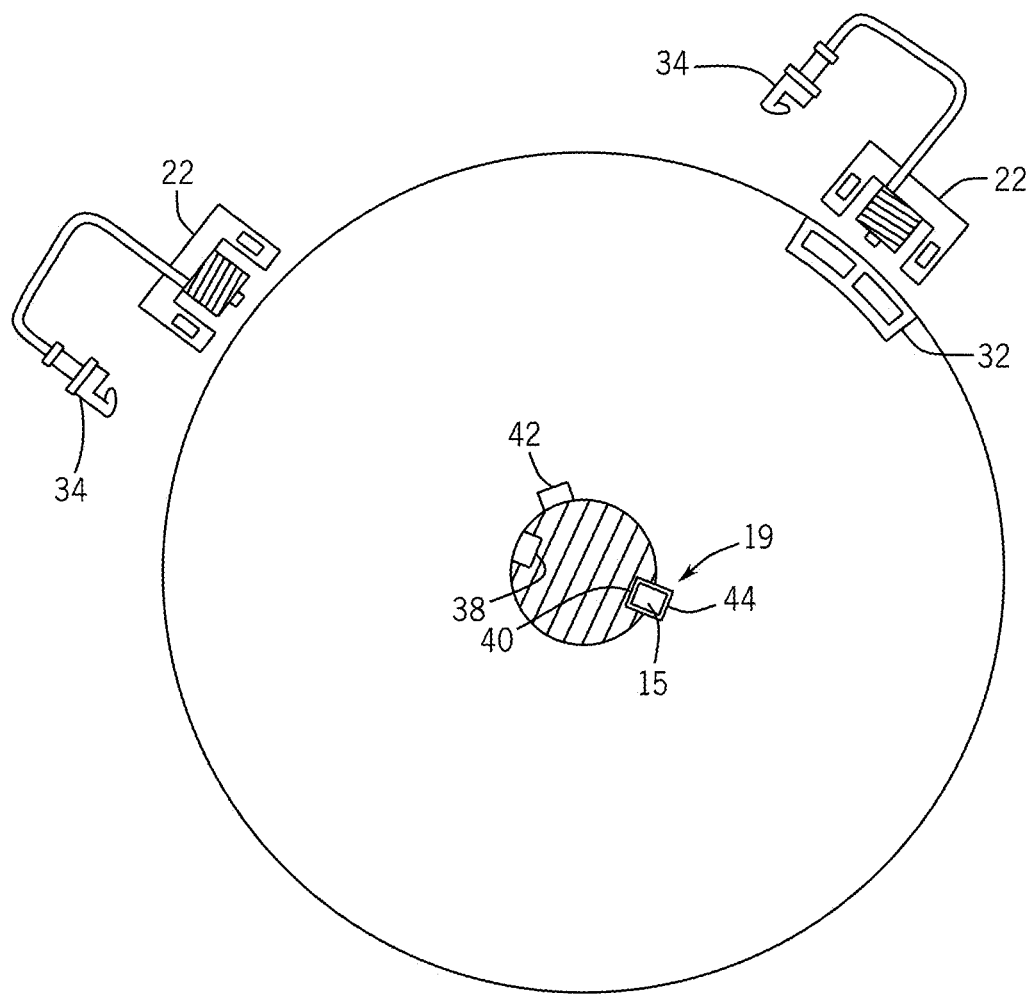
FIG. 8 a detailed view of a further embodiment of an example of a dual-keyed flywheel and a crankshaft with a varied offset of FIG. 5 in a second position.

As depicted in FIG. 7, if the first ignition timing option 17 is utilized and the flywheel 16 is mounted to the crankshaft 14 where the first keyway 38 of the crankshaft 14 is aligned with the first keyway 42 of the flywheel 16, the magnet 32 may have a position ignition timing of a first setting before TDC (e.g. 20 degrees before TDC within a range of tolerance that may span +/−2 degrees, +/−5 degrees, or +/−10 degrees). As depicted in FIG. 8, if the second ignition timing option 19 is utilized and the second keyway 44 of the flywheel 16 is aligned with the second keyway 40 of the crankshaft 14, the magnet position may be rotated in a range (e.g., a range of 10 to 20 degrees) about the crankshaft 14 and have a position ignition timing in the range of 30-40 degrees before TDC An example of use of the dual-keyed configuration may be an engine 10 configured to operate using propane or natural gas as the fuel, where propane requires an optimal ignition timing of a first number of degrees from TDC (e.g., 27 degrees before TDC) and natural gas requires an optimal ignition timing of a second number of degrees before TDC (e.g., 37 degrees before TDC). If a user chooses to operate the engine 10 using propane, aligning the first keyway 38 of the crankshaft 14 and first keyway 42 of the flywheel 16 allows for the optimal timing of use of propane as the fuel type upon set up of the engine 10 and mounting of the flywheel 16 to the crankshaft 14. If, a user chooses to operate the engine 10 using natural gas, aligning the second keyway 44 of the crankshaft 14 with the second keyway 44 of the flywheel 16 may allow for the optimal timing of use of natural gas as the fuel type upon set up of the engine 10 and mounting of the flywheel 16 to the crankshaft 14.

By utilizing and aligning the first crankshaft keyway 38 and first flywheel keyway 42 or utilizing the second crankshaft keyway 40 and second flywheel keyway 44, a technician may setup the engine 10 for the desired or chosen fuel type without need for multiple flywheels or different engines. The disclosed embodiments have the advantage of reducing the present inventory of flywheels by modifying an existing flywheel to add an additional keyway. A manufacturer with an inventory of flywheels containing one or more keyways may modify those flywheels by adding (i.e. cutting) an additional keyway at the desired predetermined angle to correspond with the ideal ignition timing as described above. In addition to modifying a flywheel, the crankshaft of an existing engine may be modified by adding (i.e. cutting) an additional keyway at the desired predetermined angle to correspond with the ideal ignition timing as described above. A manufacturer may then take inventory of engines and flywheels that were previously manufactured for one fuel type and modify the crankshaft and flywheel to allow the engine to operate with a different fuel type.

In addition, existing flywheels and/or crankshafts may be modified to include additional keyways, which provides the advantage of facilitating changing the fuel of an engine from one type to another. As described above, different fuels may have different optimal ignition timings. An engine in operation using one fuel type (i.e. natural gas) may be switched to operating using a different fuel type (i.e. propane). By switching fuel types, it may be necessary to change the ignition timing of the engine to obtain optimal efficiency and power. In addition to changing the flywheel and modifying the ignition timing as described herein, changing the fuel type over from one fuel to another may require that the spark plugs be changed and the air to fuel ratio of the carburetor be adjusted by changing fuel system control components.

Depicted in FIGS. 9-12, is a further embodiment of the dual-keyed configuration that utilizes the dual-keyed configuration as described above, however, the placement of the keyways of the crankshaft 14 and keyways of the flywheel are interchanged.

Figure 9:
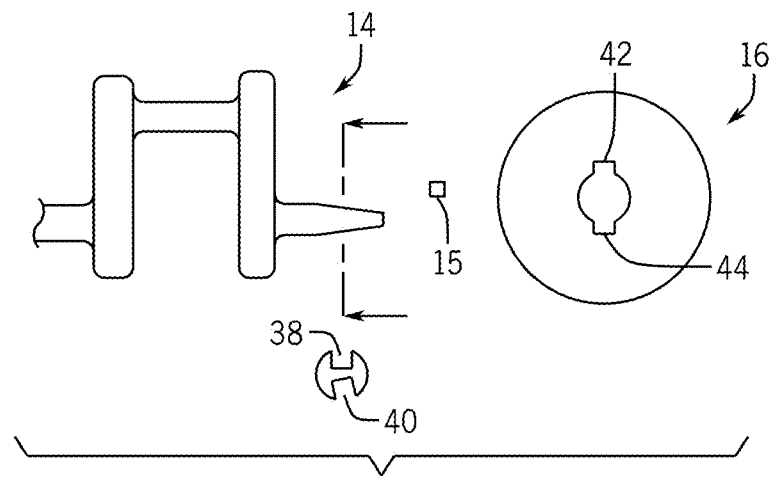
FIG. 9 illustrates another embodiment of a detailed view of an example of a dual-keyed flywheel with varied offset and a crankshaft.

FIG. 9 illustrates a detailed view of the crankshaft 14 and flywheel 16 utilizing a dual-keyed configuration to provide two relative alignments between the crankshaft 14 and the flywheel 16, and accordingly two ignition timing options for the engine 10 using the same flywheel 16 and ignition module 22. In this embodiment, two keyways (first keyway 38, second keyway 40) are formed on the crankshaft 14 and two keyways (first keyway 42, second keyway 44) are formed on the flywheel 16. Aligning the first keyway 38 of the crankshaft 14 and the first keyway 42 of the flywheel 16 provides for a first ignition timing position option 17 and aligning the second keyway 40 of the crankshaft 14 and the second keyway 44 of the flywheel 16 provides for a second ignition timing position option 19.

Figure 10:
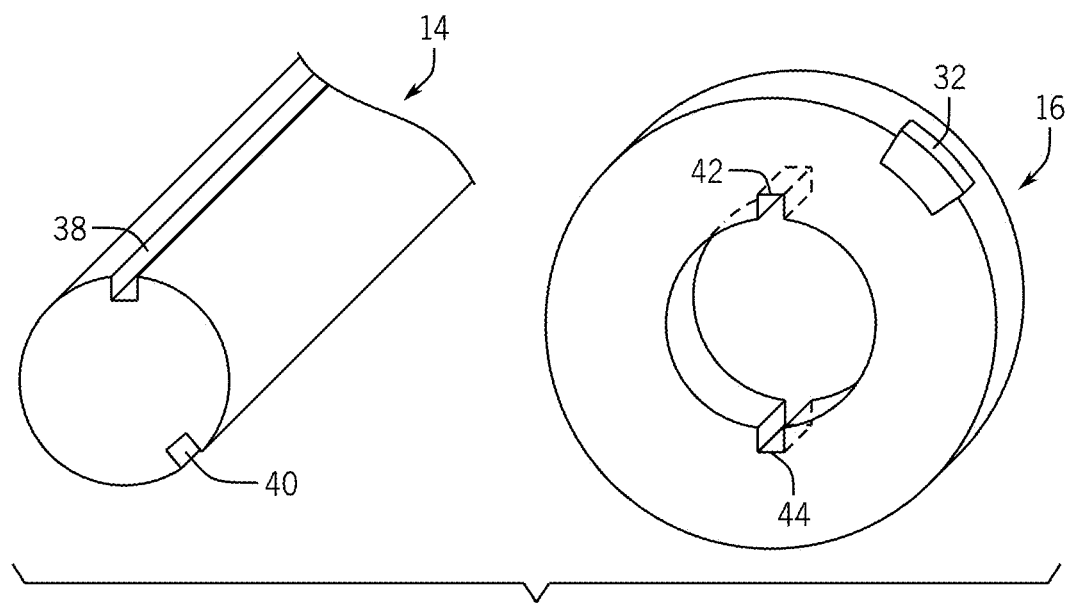
FIG. 10 illustrates a perspective of the flywheel and crankshaft of FIG. 9.

In the dual-keyed configuration as depicted in FIGS. 9 and 10, the crankshaft 14 includes two keyways. A first keyway 38 is on top of the crankshaft 14 near or at TDC and a second keyway 40 is located less than 180 degrees from TDC of the crankshaft 14. The flywheel 16 may include two keyways to correspond with two desired options for ignition timing of the engine. A first keyway 42 may be included within the flywheel 16 and configured to align with the first crankshaft keyway 38 at or near TDC. The magnet 32 of the flywheel 16 may be fixed on the flywheel 16 at an angular displacement position that retards the crankshaft (including the connecting rod and piston head) before TDC when the magnet passes the ignition module 22 when rotating. The angular orientation of one of the desired ignition timings is fixed at a first setting (e.g. 20 degrees) from TDC. A second flywheel keyway 44 may be spaced apart from the first keyway 42 by a predetermined angle such as 180 degrees.

Figure 11:
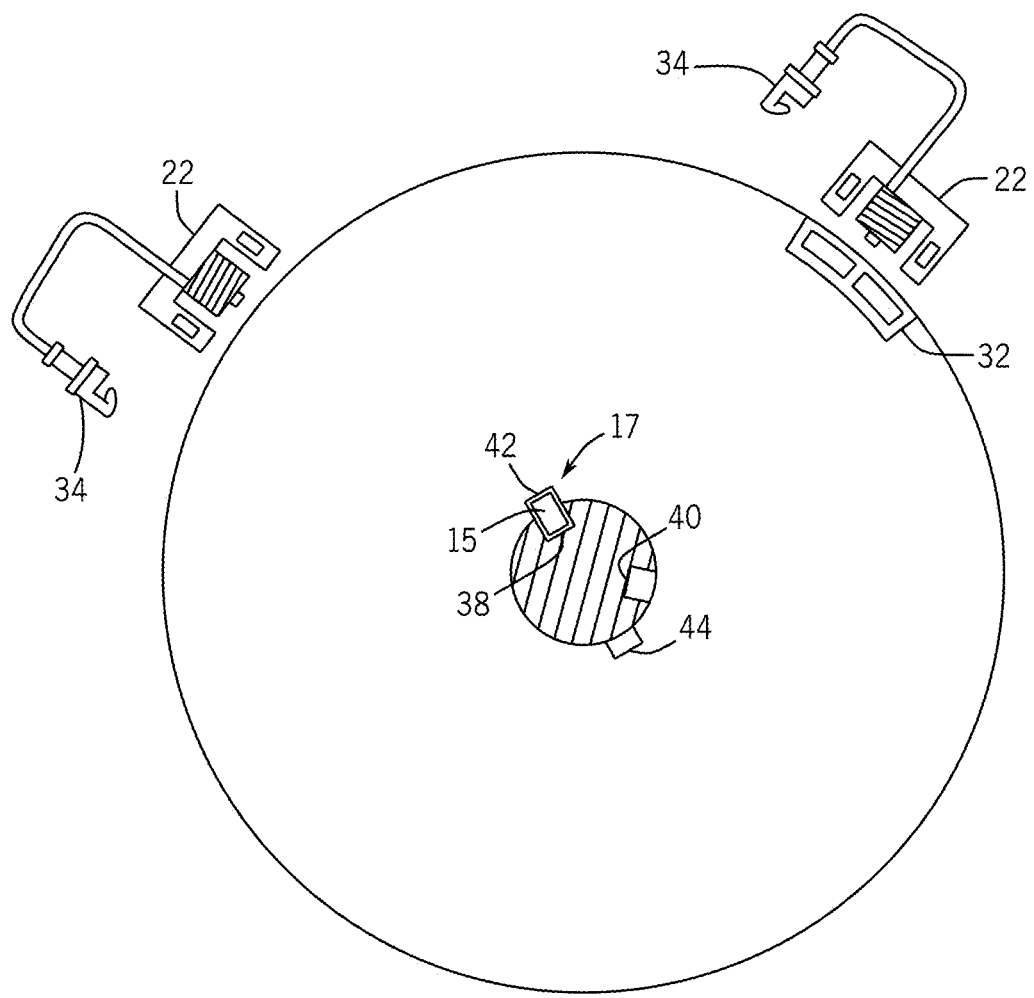
FIG. 11 illustrates a view of a varied dual-keyed flywheel offset and dual-keyed offset crankshaft configuration in connection with ignition module of FIG. 9 in a first position.
Figure 12:
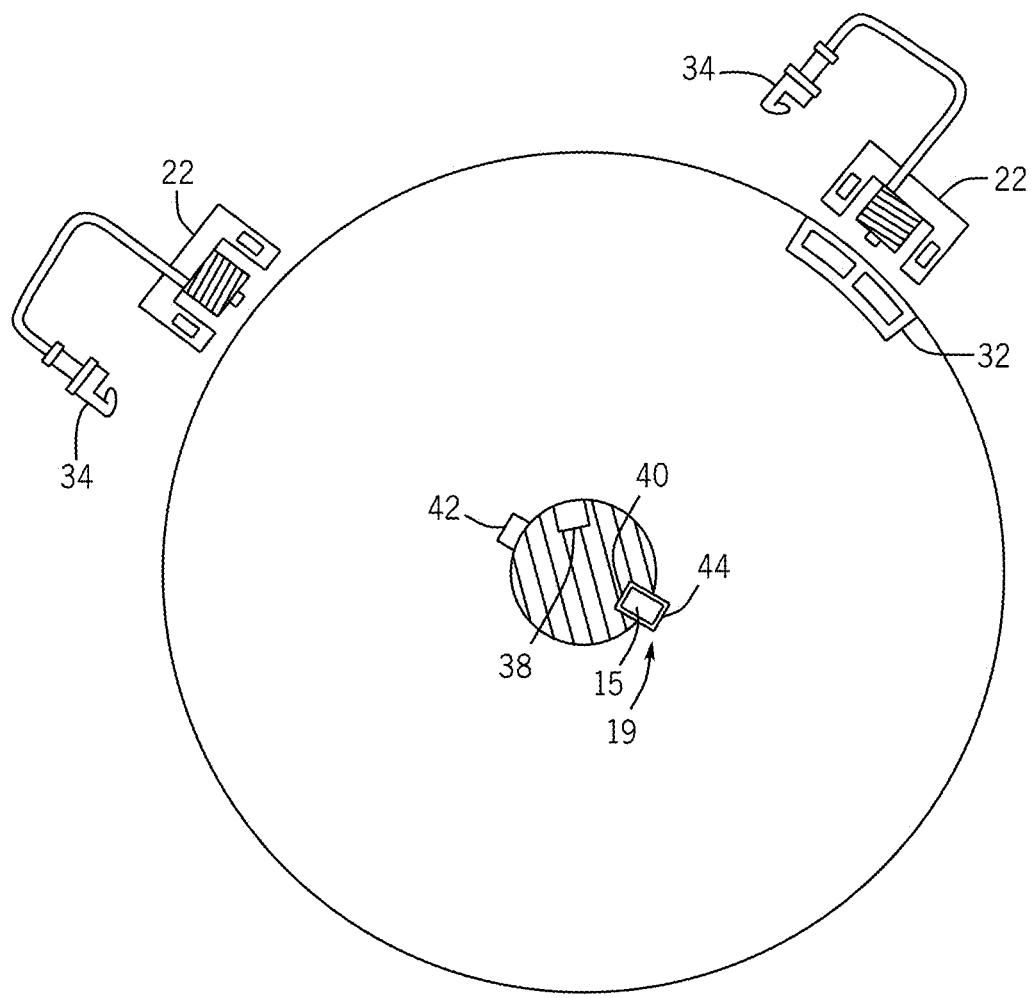
FIG. 12 illustrates a view of a dual-keyed offset flywheel and varied dual-keyed offset crankshaft offset configuration in connection with an ignition module of FIG. 9 in a second position.

As depicted in FIG. 11, if the first ignition timing option 17 is utilized and flywheel 16 is mounted to the crankshaft 14 where the first keyway 38 of the crankshaft 14 is aligned with the first keyway 42 of the flywheel 16, the magnet 32 may have a position ignition timing of a first setting (e.g. 26 degrees) before TDC. As depicted in FIG. 12, if the second ignition timing option 19 is utilized and the second keyway 44 of the flywheel 16 is aligned with the second keyway 40 of the crankshaft 14, the magnet 32 position may be rotated slightly about the center of the crankshaft 14 and have a position ignition timing degree of a second setting (e.g. 20 degrees) from TDC. As depicted in FIGS. 11 and 12, the second keyway is positioned on the crankshaft less than 180 degrees from TDC in the clockwise direction. It is also possible to position the second keyway less than 180 degrees from TDC in the counter-clockwise direction. This would result in a second ignition timing option that has a larger angular displacement than the first ignition timing option 17.

Figure 13:
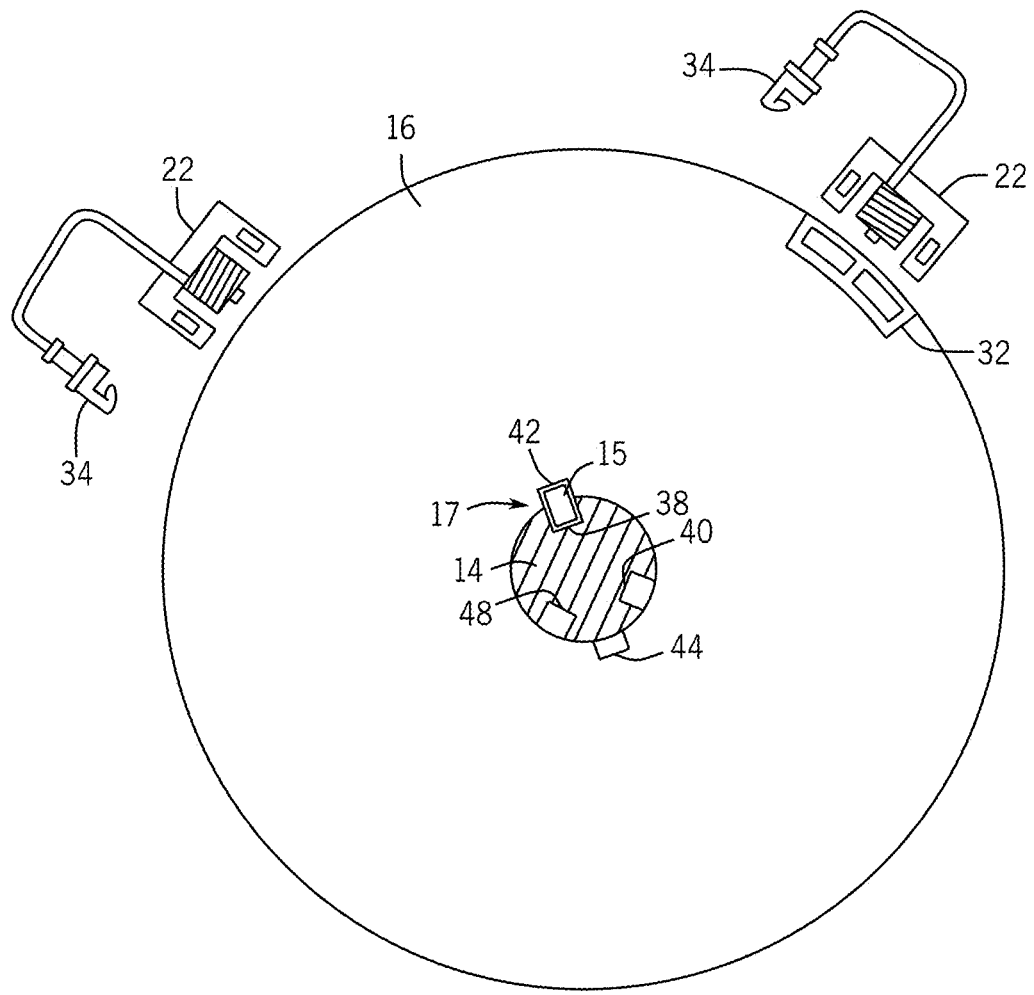
FIG. 13 illustrates a view of a three-keyed flywheel in a first position.
Figure 14:
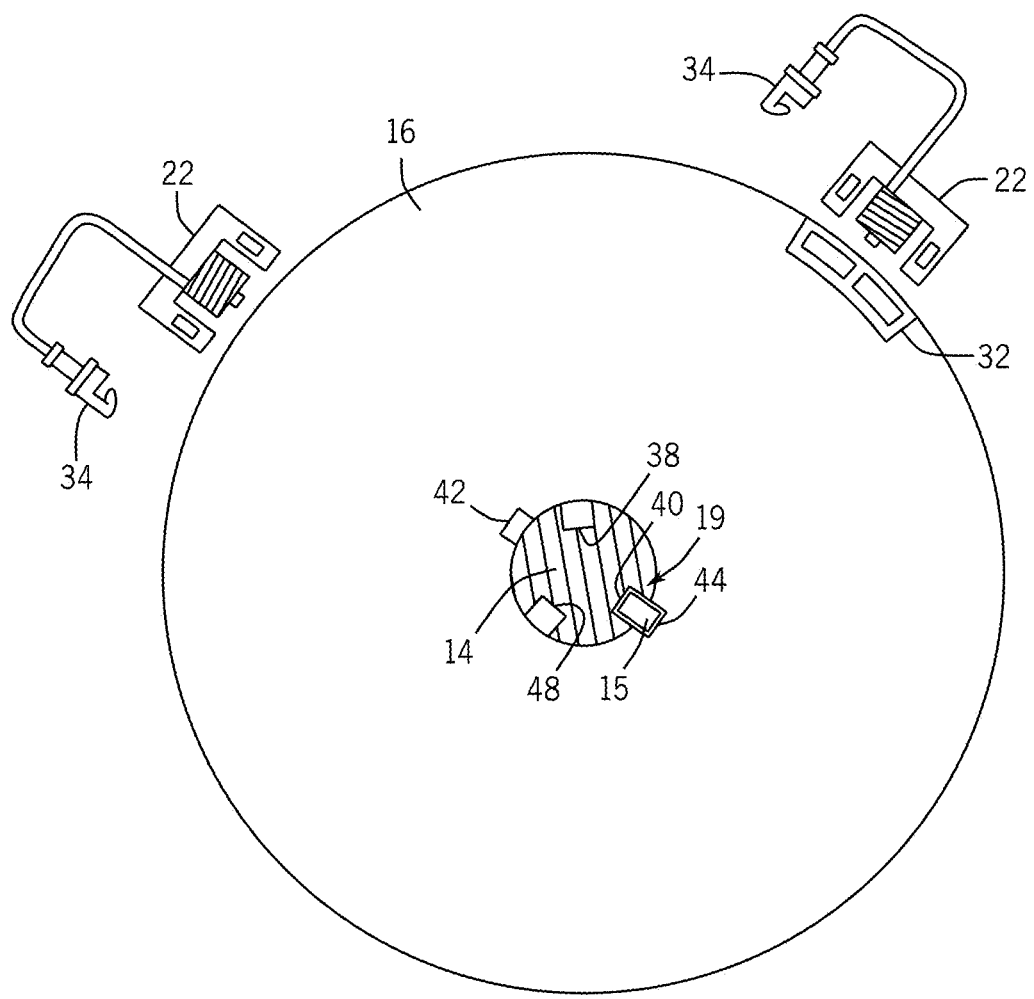
FIG. 14 illustrates a view of a three-keyed flywheel in a second position.
Figure 15:
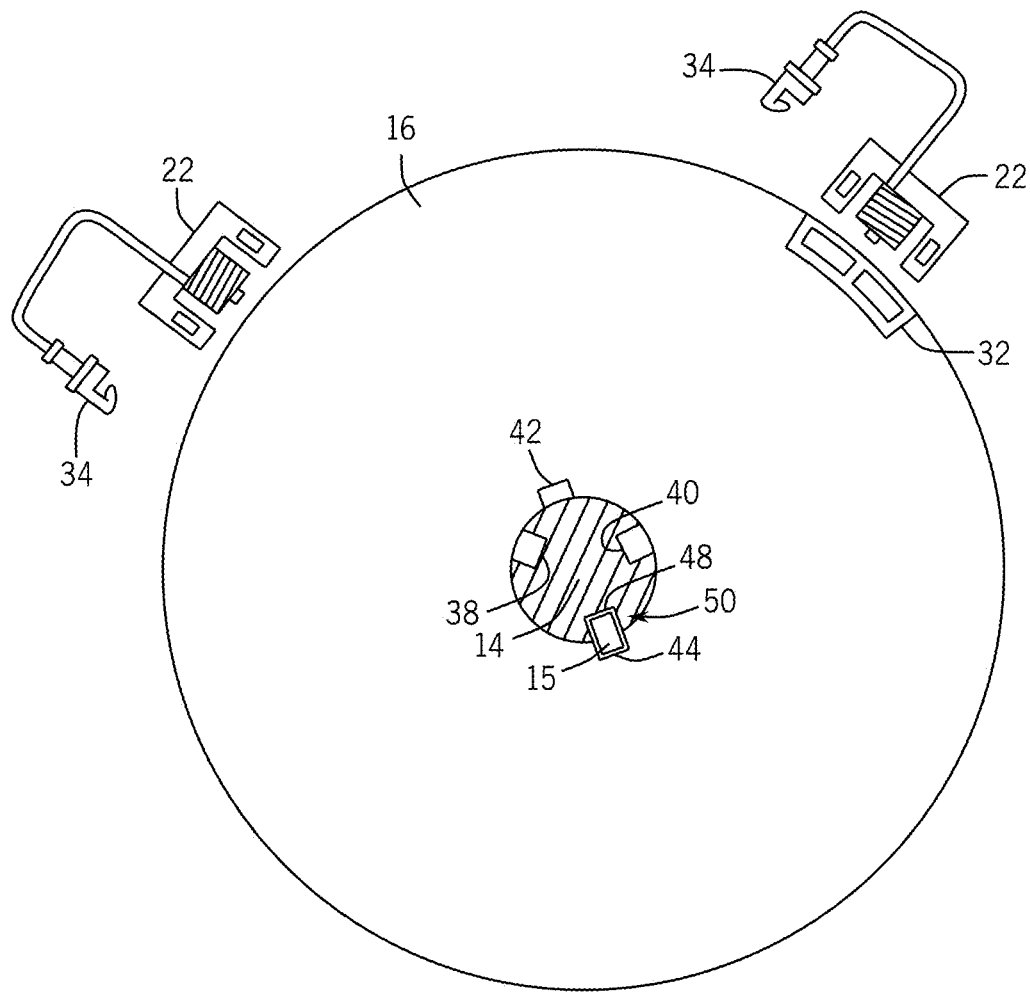
FIG. 15 illustrates a view of a three-keyed flywheel in a third position.

Depicted in FIGS. 13-15, is a further embodiment including a three-keyed flywheel configuration and dual-keyed crankshaft to provide three relative alignments between the crankshaft 14 and the flywheel 16, and accordingly three ignition timing options for the engine 10 using the same flywheel 16 and ignition module 22.

FIG. 13 illustrates a three-keyed configuration to provide three relative alignments between the crankshaft 14 and the flywheel 16, and accordingly three ignition timing options for the engine 10 using the same flywheel 16 and ignition module 22. The flywheel 16 may include three keyways (first keyway 40, second keyway 44, third keyway 46) spaced to correspond to three desired options for ignition timing of the engine. The corresponding crankshaft 14 may include two keyways (first keyway 38, second keyway 40) are formed on the crankshaft 14 (see the crankshaft depicted in FIGS. 5 and 6). A first flywheel keyway 42 may be configured to align with the first crankshaft keyway 38 at TDC. The other two flywheel keyways (44 and 46) may be configured to align with the second keyway 40 of the crankshaft 14. The magnet 32 of the flywheel 16 may be fixed on the flywheel 16 at an angular orientation of one of the desired ignition timings at a first setting of degrees (e.g. 20 degrees before TDC). A second flywheel keyway 44 may be spaced apart from the first flywheel keyway 42 in a range of 160 degrees to 180 degrees in a clockwise direction. A third flywheel keyway 46 may be spaced apart from the first flywheel keyway 42 in a range of 160 degrees to 180 degrees in a counterclockwise direction of the first keyway 42.

As depicted in FIG. 13, aligning the first keyway 38 of the crankshaft 14 and the first keyway 42 of the flywheel 16 provides for a first ignition timing position option 17. Illustrated in FIG. 14, aligning the second keyway 40 of the crankshaft 14 and the second keyway 44 of the flywheel 16 provides for a second ignition timing position option 19. Illustrated in FIG. 15, aligning the second keyway 44 of the crankshaft 14 and the third keyway 48 provides for a third ignition timing position option 50. Alternatively, the flywheel may be configured such that two of the flywheel keyways are positioned on the flywheel to align with the first keyway 38 of the crankshaft.

A further embodiment is depicted in FIG. 13, where a three-keyed flywheel 16 is utilized with a dual-keyed crankshaft 14 (e.g., crankshaft 14 of FIGS. 5 and 6). The configuration depicted in FIG. 13 provides for three options for ignition timing of the engine 10. In this embodiment, two keyways (first keyway 38, second keyway 40) are formed on the crankshaft 14 as depicted in FIG. 5 and three keyways (first keyway 40, second keyway 44, and third keyway 46) are formed on the flywheel 16. In the three-keyed configuration, the three keyways may be spaced apart approximately 120 degrees or in a range of 110 to 130 degrees.

If the first ignition timing option 17 is utilized and the flywheel 16 is mounted to the crankshaft 14 where the first keyway 38 of the crankshaft 14 is aligned with the first keyway 42 of the flywheel 16, the magnet 32 may have a position ignition timing in a range of 20-30 degrees before TDC. Utilizing the second ignition timing option 19 where the second keyway 44 of the flywheel 16 is aligned with the second keyway 40 of the crankshaft 14, the magnet 32 position may be rotated in a range of 10 to 20 degrees in a clockwise direction about the center of the crankshaft 14 and have a position ignition timing in the range of 30-50 degrees before TDC. Utilizing the third ignition timing option 50 where the third keyway 46 of the flywheel 16 is aligned with the second keyway 40 of the crankshaft 14, the magnet 32 position may be rotated in a range of 10 to 20 degrees in a counter clockwise direction about the center of the crankshaft and have a position ignition timing in the range of 0-20 degrees before TDC.

As an example, the engine 10 may be configured to operate using propane, natural gas or gasoline as the fuel, where propane requires an optimal ignition timing of 27 degrees before TDC; natural gas requires an optimal ignition timing of 37 degrees before TDC; and gasoline requires an optimal ignition timing of 20 degrees before TDC. If a user chooses to operate the engine 10 using propane, aligning the first keyway 38 of the crankshaft 14 and first keyway 42 of the flywheel 16 allows for the optimal timing of use of propane as the fuel type upon set up of the engine 10 and mounting of the flywheel 16 to the crankshaft 14. If, a user chooses to operate the engine 10 using natural gas, aligning the second keyway 44 of the crankshaft 14 with the second keyway 44 of the flywheel 16 may allow for the optimal timing of use of natural gas as the fuel type upon set up of the engine 10 and mounting of the flywheel 16 to the crankshaft 14. If, a user chooses to operate the engine 10 using gasoline, aligning the second keyway 44 of the crankshaft 14 with the third keyway 46 of the flywheel 16 may allow for the optimal timing of use of gasoline as the fuel type upon set up of the engine 10 and mounting of the flywheel 16 to the crankshaft 14.

Figure 16:
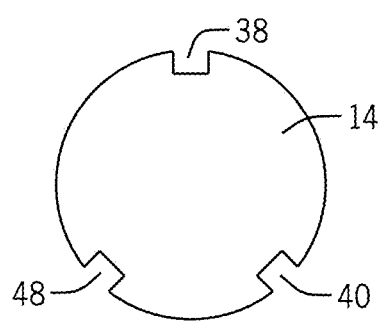
FIG. 16 illustrates a three-keyed crankshaft.

Illustrated in FIG. 16, an alternative to the above three-keyed configuration of two keyways being formed on the crankshaft 14 and three keyways formed within the flywheel 16, three keyways may be formed on the crankshaft 14 and two keyways formed on the flywheel 16 as depicted in FIG. 9. In this embodiment, the flywheel 16 includes two keyways spaced 180 degrees apart, where the magnet 32 may have a position ignition timing in a range of 20-30 degrees before TDC. The crankshaft 14 may have a first keyway 38 at TDC and have a second keyway 38 may be spaced apart from the first crankshaft keyway 42 in a range of 160 degrees to 180 degrees in a clockwise direction. A third keyway 48 may be formed in the crankshaft 14 and may be spaced apart from the first crankshaft keyway 38 in a range of 160 degrees to 180 degrees in a counter clockwise direction of the second crankshaft keyway 40.

Additional keyways may be placed in the crankshaft 14 and additional keyways may be formed in the flywheel 16 to provide for four or more ignition timing options. Further, the multiple-keyed configuration of the present invention may be used in combination with the use of an ignition system controlled by a processor as described above to provide for additional options for engine 10 ignition timing.

Figure 17:
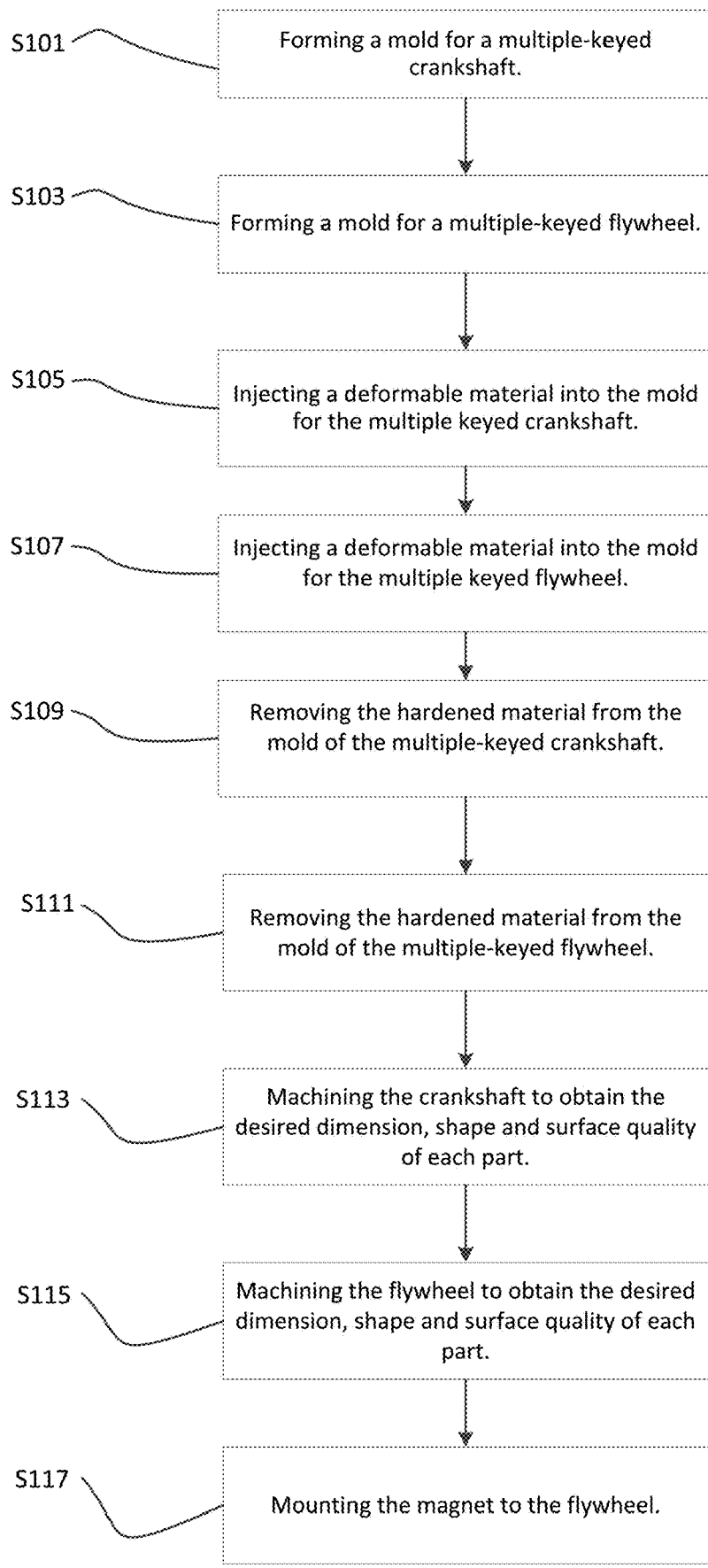
FIG. 17 illustrates an example flowchart for manufacturing a rotational apparatus.

FIG. 17 illustrates an example flowchart for manufacturing a rotational apparatus of a multiple-keyed crankshaft and flywheel. Additional, different, or fewer acts may be provided. The acts are performed in the order shown or other orders. The acts may also be repeated.

At act S101, a mold for a crankshaft is formed. The mold includes a flywheel drive portion, multiple keyways, a power output shaft portion, counterweights, main journals, and rod journals. The flywheel drive portion is shaped to form a tapered longitudinal portion of the crankshaft. The output shaft portion is shaped to form a cylindrical portion in line with the longitudinal portion of the crankshaft. The counterweights are shaped to form extended portions off of the longitudinal portion of the crankshaft. The main journals and rod journals are shaped to form offset cylindrical portions from the longitudinal portion of the crankshaft. Alternatively, the keyways may be formed by machining after the crankshaft is formed.

At act S103, a mold for a multiple-keyed flywheel is formed. The mold includes a cylindrical shaped portion forming the flywheel, multiple keyways, a center bore within the flywheel, and a magnet mounting portion. The center bore is cylindrically shaped and formed through the flywheel. The magnet mounting portion is shaped to accept a magnet fastened to the flywheel. Alternatively, the keyways may be formed by machining after the flywheel is formed.

At act S105, a deformable material is injected or poured into the crankshaft mold. The material may include cast iron, ductal iron, aluminum, chrome steel, or steel. The deformable material takes the shape of the mold. In one example, as the deformable material cools, the deformable material hardens to a rigid material. In another example, heating, curing or another technique is used to harden the deformable material into the crankshaft.

At act S107, a deformable material is injected or poured into the flywheel mold. The material may include cast iron, ductal iron, aluminum, chrome steel, or steel. The deformable material takes the shape of the mold. In one example, as the deformable material cools, the deformable material hardens to a rigid material. In another example, heating, curing or another technique is used to harden the deformable material into the flywheel.

At act S109, the crankshaft including the hardened material is removed from the mold. The crankshaft includes multiple keyways, a flywheel drive portion, a power output shaft portion, counterweights, main journals, and rod journals. The crankshaft may be further machined to achieve the desired dimension, shape or finish.

At act S111, the flywheel including the hardened material is removed from the mold. The flywheel includes a cylindrical shaped portion forming the flywheel, a keyway, a center bore within the flywheel, and a magnet mounting portion. The flywheel may be further machined to achieve the desired dimension, shape or finish.

At act S113, the crankshaft, including the flywheel drive portion, multiple keyways, power output shaft portion, counterweights, main journals, and rod journals are machined to obtain the desired dimension, shape and surface quality of each part.

At act S115, the flywheel, including the cylindrical shaped portion forming the flywheel, keyway, center bore within the flywheel, and magnet mounting portion are machined to obtain the desired dimensions and surface quality of each part.

At act S117, a magnet is mounted to the flywheel using fasteners and/or a mounting bracket. The magnet may be secured to the circumference of the flywheel at the desired angular displacement to TDC in order to align with the ignition module of the engine. The location in which the magnet may be determined based on the fuel types used and number of keyways of the crankshaft and keyways of the flywheel. Each fuel type has an ideal timing of the firing of the engine that depends on the burn rate and compression ratio of the fuel. For example, natural gas may have an ideal timing of 37 degrees before TDC. The magnet may then be mounted to the edge of the flywheel at a location where an aligned flywheel key and crankshaft key, when the magnet rotation passes the ignition module the piston is 37 degrees before TDC.

Figure 18:
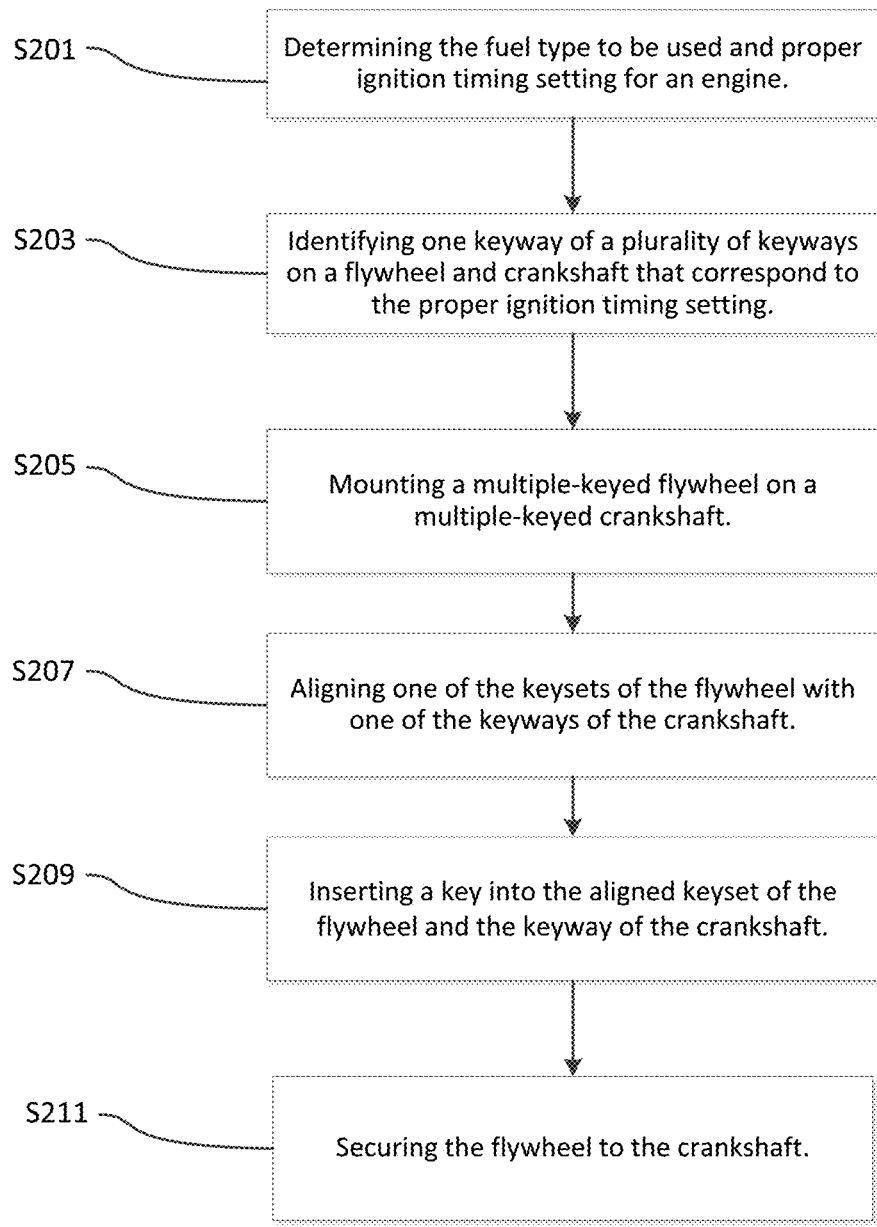
FIG. 18 illustrates an example flowchart for operation of rotational apparatus.

FIG. 18 illustrates an example flowchart for installing a multiple keyed crankshaft on a multiple keyed flywheel. Additional, different, or fewer acts may be provided. The acts are performed in the order shown or other orders. The acts may also be repeated.

At act, S201, a technician may determine the fuel type to be used in the engine types (i.e. gasoline, natural gas, propane, liquid propane, or others). Certain engines may be able to operate with different fuel types with little to no modification. In this circumstance, in order to obtain optimal performance of the engine the ignition timing of the engine may need to be adjusted. Each fuel type has an ideal burn rate and compression ratio that affects the ignition timing of an engine. Ignition engine timing may be based on the angular displacement of the crankshaft from TDC of the piston within the cylinder where ignition of the spark plug produces the most power and efficiency. The crankshaft and flywheel may have a keyway, establishing the ideal timing for each fuel type operation of the engine. For example, a flywheel that has two keyways and a crankshaft that has two keyways, one keyway for propane and another configured for natural gas using indicia.

At act S203, the technician may identify the correct flywheel and crankshaft keyway that may be associated with the chosen fuel type. Each keyway of the flywheel and crankshaft will be associated with the ideal timing for a particular fuel type. Indicia may be used to identify which keyway on the flywheel and crankshaft relate to a fuel type. For example, if it is determined that natural gas is the chosen fuel type, the technician may identify the keyways on the flywheel and crankshaft designated for natural gas.

At act S205, the center bore of the flywheel may be aligned with the crankshaft, and the flywheel may be mated onto the crankshaft. The flywheel may be slid on to the crankshaft but not secured or fastened thereto in order for the crankshaft and flywheel keyways to be aligned.

At act S207, the keyway of the flywheel is aligned with a selected one of the two keyways of the crankshaft that corresponds to the selected fuel type from act S201. These aligned keyways may be a different size as compared to the other keyway of the crankshaft and flywheel. Similarly, the aligned keyways may have a different shape, color, or material then the other keyways of the flywheel and crankshaft.

At act 209, a key may be inserted to the aligned flywheel keyway and crankshaft keyway. The key may be a snug fit, but with sufficient clearance to slide in the aligned keyways. Each key for different fuel types may be different and may be configured to correspond to the unique size or shape of the aligned keyways so as to only fit within the correctly aligned keyways. The key corresponding to a one fuel type as compared to keys for other fuel types may have a different shape, color, or material then the other keyways of the flywheel and crankshaft.

At act 211, the aligned flywheel and crankshaft are press fit together. The flywheel is manipulated onto the crankshaft and a bolt and washer is used to fix the press fit connection. The press fit connect sufficiently connects the flywheel and crankshaft and fixes them in place.

Figure 19:
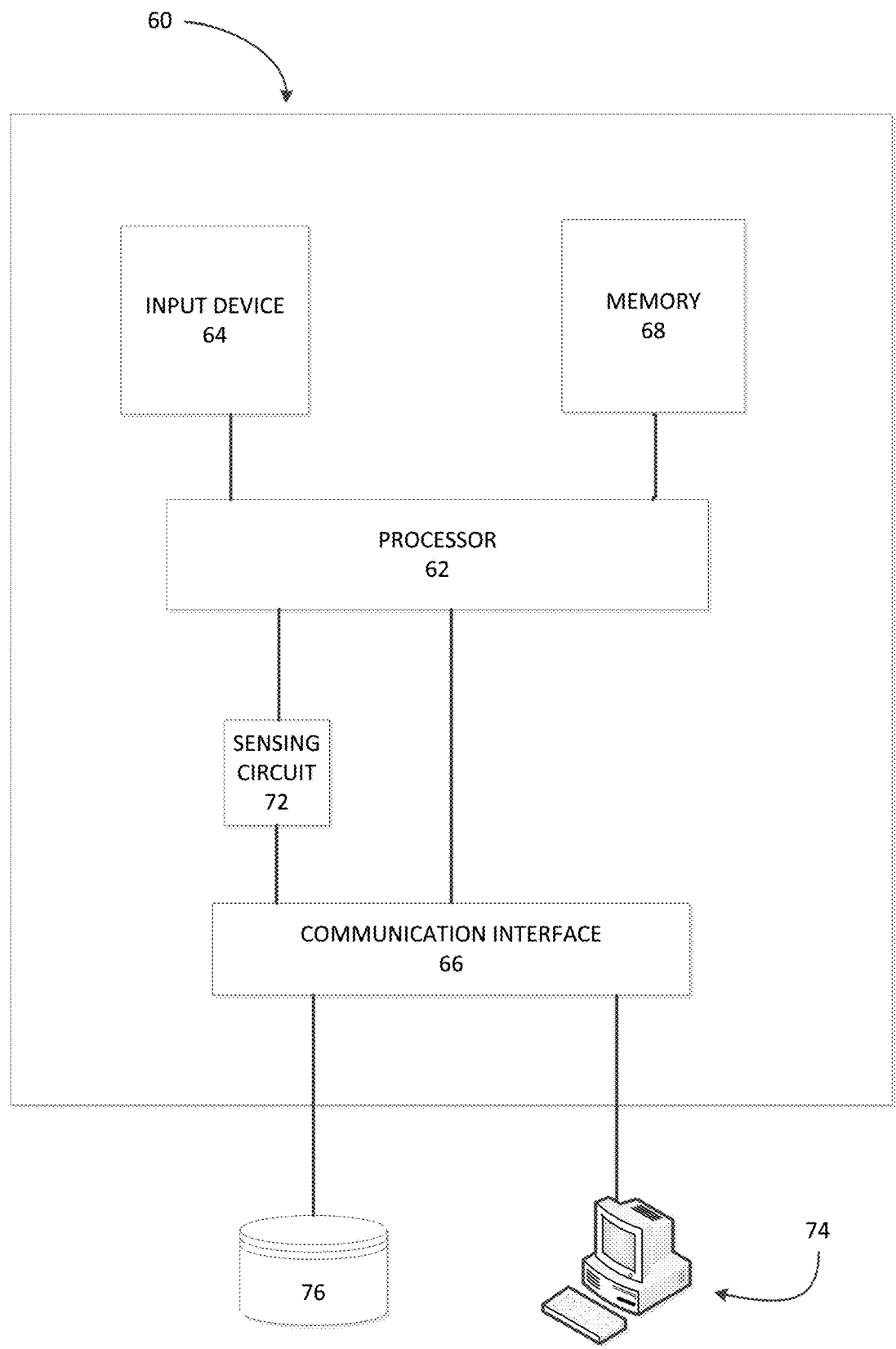
FIG. 19 illustrates a controller for an internal combustion engine.

FIG. 19 illustrates a controller for monitoring an engine under load to determine the performance and efficiency in connection with timing adjustments.

The controller 60 may include a processor 62, an input device 64, a communication interface 66, a memory 68, and a display 70. The controller 60 may receive data from sensors or other input devices. In one instance, the controller 60 may receive measured oxygen levels or the difference between the amount in oxygen in the exhaust and the air from an oxygen sensor and use that data to determine the amount of fuel burned at the engine's presently set timing. Based on the presently set keyway selections and measured values from the oxygen sensor, the controller may identify which other keyway of a crankshaft to align with one of the other keyways of the flywheel. In another instance, the controller 60 may access memory 68 for a predetermined timing setting that corresponds to an identification of which keyway of a crankshaft to align with one of the keyways of the flywheel.

The controller may convey this identification using indicia disposed on the flywheel and crankshaft. The input device 64 may be a hand held device for inputting commands or selections into the processor 62. The commands or selection may relate to fuel type settings, ignition timing settings, or air to fuel mixture settings. The display 70 may be integrated with the input device 64 or supplied by workstation 74. The database 76 may include settings for the engine 10 or the ignition module 22, including ignition timing settings fuel type settings, or data obtained from sensors. This information may be included in a table and stored in the memory 68. Additional, different, or fewer components may be included.

The sensing circuit 72 may be a rotation meter, tachometer, or dynamometer, where the rotational speed of the engine is calculated and/or monitored. The sensing circuit 72 may be utilized with the processor 62 to further change the timing of the engine to gain advanced efficiency or power. In this instance, an electronically controlled ignition system measures the rpm of the engine, and based upon the rpm of the engine, the processor 62 is programed to fire at a specific angle for a particular speed range.

The sensing circuit 72 may also include gas sensors for monitoring the air into the engine and exhaust out of the engine to evaluate the engine's performance based on the selected timing. Example gas sensors may include one or more of oxygen sensor, carbon dioxide sensor, carbon monoxide, or an emission sensor. It may be desirable to adjust the engine timing after performance and efficiency of the engine are determined by a sensor of the sensing circuit 72 for an engine under load. The sensor may measure air into the engine and exhaust and evaluate the oxygen level, burn efficiency and residual unused fuel to determine if ignition timing should be adjusted. The sensor may then transmit obtained data to the controller 60. Other types of sensors for the sensing circuit 72 includes: motion sensors, temperature sensors, speed sensors, pressure sensors, torque sensor and internal engine sensors.

The processor 62 may control the engine, ignition module 22 or ignition system. The processor 62 may control the speed of the engine or firing of the spark plug based on the output of any of these sensors. The processor 62 may further control the ignition timing or a charging system of the engine. The processor 62 may calculate the horsepower of the engine. The processor 62 may also be used to evaluate output of sensors and sensing circuit to enhance engine performance and efficiency such as exhaust output. The oxygen in and exhaust output information collected by the sensors described above, may be analyzed by the processor which then determines if advancing or retarding ignition timing is appropriate when the engine is under load. The processor 62 may include a general processor, digital signal processor, an application specific integrated circuit (ASIC), field programmable gate array (FPGA), analog circuit, digital circuit, combinations thereof, or other now known or later developed processor. The memory 68 may be a volatile memory or a non-volatile memory. The memories may include one or more of a read only memory (ROM), random access memory (RAM), a flash memory, an electronic erasable program read only memory (EEPROM), or other type of memory. The memory 68 may be removable from the controller 60, and the memory 68 may be removable from the engine, such as a secure digital (SD) memory card.

The communication interface 66 may include a physical interface, an electrical interface, and/or a data interface. The communication interface 66 provides for wireless and/or wired communications in any now known or later developed format. In addition to ingress ports and egress ports, the communication interface 66 may include any operable connection. An operable connection may be one in which signals, physical communications, and/or logical communications may be sent and/or received. An operable connection may include a physical interface, an electrical interface, and/or a data interface.

The communication interface 66 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

Any of the techniques described above may be embodied on a non-transitory computer readable medium, which may be a single medium or multiple media, such as a centralized or distributed database, and/or associated caches and servers that store one or more sets of instructions. The term "non-transitory computer-readable medium" shall also include any medium, except a signal per se, that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus comprising:
   a shaft comprising a first shaft slot and a second shaft slot;
   a rotational element comprising a magnet for use with an ignition module and a center bore comprising a first rotational element slot and a second rotational element slot on a circumference of the center bore; and
   a key configured to align the shaft to the rotation element, wherein when a first ignition timing is selected, the first shaft slot is aligned to the first rotational element slot in a first position and, when a second ignition timing is selected, the second shaft slot is aligned to the second rotational element slot in a second position.

2. The apparatus of claim 1, wherein the key aligns the shaft and the rotational element in the first position corresponding to a first fuel type and aligns the shaft and the rotational element in the second position corresponding to a second fuel type.

3. The apparatus of claim 1, wherein the first shaft slot and the second shaft slot are different sizes and the first rotational element slot and the second rotational element slot are different sizes.

4. The apparatus of claim 3, wherein the key is configured to mate with the first shaft slot and the first rotational element slot or the second shaft slot and the second rotational element slot.

5. The apparatus of claim 1, wherein a portion of the shaft is tapered to accept the rotational element.

6. The apparatus of claim 1, wherein the rotational element further comprises a third rotational element slot, and wherein the key aligns the second shaft slot to the third rotational element slot in a third position corresponding to a third ignition timing option.

7. The apparatus of claim 1, wherein the shaft further comprises a third shaft slot, and
   wherein the key aligns the first rotational element slot or the second rotational element slot to the third shaft slot in a third position corresponding to a third ignition timing option.

8. The apparatus of claim 1, wherein the first rotational element slot includes indicia associated with the first shaft slot.

9. The apparatus of claim 1, wherein the shaft is a crankshaft.

10. The apparatus of claim 1, wherein the rotational element is a flywheel.

11. The apparatus of claim 1, wherein the first shaft slot, the second shaft slot, the first rotational element slot, and the second rotational element slot are keyways.

12. The apparatus of claim 1, wherein the first ignition timing option corresponds to the magnet at a first setting of degrees from top dead center (TDC) of the shaft, and
 wherein the second ignition timing option corresponds to the magnet at a second setting of degrees from the TDC of the shaft.

13. A method for installing a rotational apparatus for use in an internal combustion engine, the method comprising:
 determining an ignition timing setting for the internal combustion engine, wherein the ignition timing setting corresponds to a first ignition timing or a second ignition timing;
 identifying a plurality of slots formed on a center bore of a rotational element and a plurality of slots formed on a shaft of the engine that correspond;
 mounting the rotational element on the shaft by inserting the shaft through the center bore; and
 aligning a first slot from the plurality of slots of the rotational element with a second slot from the plurality of slots of the shaft with a key when the first ignition timing is determined;
 aligning a third slot from the plurality of slots of the rotational elements with a fourth slot from the plurality of slots of the shaft with the key when the second ignition timing is determined.

14. The method of claim 13, wherein the first slot of the rotational element has a different size than the third slot.

15. A method for manufacturing a rotational apparatus for use in an internal combustion engine, the method comprising:
 forming a center bore with a first rotational element slot and a second rotational element slot on a circumference of the center bore within a rotational element; and
 joining a magnet to the rotational element at a predetermined angular orientation;
 wherein the first rotational element slot and the second rotational element slot correspond to a first shaft slot and a second shaft slot formed on a distal end of a shaft of the engine, and
 wherein a key aligns the first shaft slot to the first rotational element slot in a first position corresponding to when a first ignition timing option is selected and aligns the second shaft slot to the second rotational element slot in a second position corresponding to when a second ignition timing option is selected.

16. The method for manufacturing the rotational apparatus of claim 15, wherein the first shaft slot and the second shaft slot are different sizes and the first rotational element slot and the second rotational element slot are different sizes, and
 wherein the key is configured to mate the first shaft slot and the first rotational element slot or the second shaft slot and the second rotational element slot.

17. The method for manufacturing the rotational apparatus of claim 15, wherein the first ignition timing option corresponds to the magnet at a first setting of degrees from top dead center (TDC) of the shaft, and
 wherein the second ignition timing option corresponds to the magnet at a second setting of degrees from the TDC of the shaft.

18. The method for manufacturing the rotational apparatus of claim 15, wherein the shaft is a crankshaft.

19. The method for manufacturing the rotational apparatus of claim 15, wherein the rotational element is a flywheel.

20. The method for manufacturing the rotational apparatus of claim 15, wherein the first shaft slot, the second shaft slot, the first rotational element slot, and the second rotational element slot are keyways.

\* \* \* \* \*